(12) United States Patent
Tokimasa et al.

(10) Patent No.: US 10,427,689 B2
(45) Date of Patent: Oct. 1, 2019

(54) VEHICLE CONTROL APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Mitsuhiro Tokimasa, Kariya (JP); Toyoharu Katsukura, Kariya (JP); Yoshihisa Ogata, Kariya (JP); Youhei Masui, Kariya (JP); Taku Sakima, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 19 days.

(21) Appl. No.: 15/529,905

(22) PCT Filed: Nov. 16, 2015

(86) PCT No.: PCT/JP2015/082075
§ 371 (c)(1),
(2) Date: May 25, 2017

(87) PCT Pub. No.: WO2016/084637
PCT Pub. Date: Jun. 2, 2016

(65) Prior Publication Data
US 2017/0327123 A1     Nov. 16, 2017

(30) Foreign Application Priority Data
Nov. 28, 2014    (JP) ................... 2014-242234

(51) Int. Cl.
*B60W 40/04*      (2006.01)
*B60R 21/00*      (2006.01)
(Continued)

(52) U.S. Cl.
CPC ............. *B60W 40/04* (2013.01); *B60R 21/00* (2013.01); *B60W 30/16* (2013.01);
(Continued)

(58) Field of Classification Search
CPC .... B60W 40/04; B60W 30/16; B60W 30/095; B60W 2420/42; B60W 2550/308; B60W 2420/52; B60R 21/00; G08G 1/167
See application file for complete search history.

(56) References Cited

U.S. PATENT DOCUMENTS

| 6,094,616 A | 7/2000 | Andreas et al. |
| 7,825,849 B2 * | 11/2010 | Tsuchida ............... G01S 13/931 342/52 |
| 2009/0244789 A1 | 10/2009 | Hong et al. |

FOREIGN PATENT DOCUMENTS

JP     2000-235699      8/2000

* cited by examiner

*Primary Examiner* — Nadeem Odeh
*Assistant Examiner* — Michael V Kerrigan
(74) *Attorney, Agent, or Firm* — Knobbe, Martens, Olson & Bear, LLP (57) ABSTRACT

A vehicle control apparatus mounted to an own vehicle to control the own vehicle according to the position of other vehicle ahead of the own vehicle is provided. The apparatus includes a setting means setting a parameter indicating whether the other vehicle is in the path of the own vehicle, based on the position of the other vehicle relative to the own vehicle in a lateral direction perpendicular to the path of the own vehicle, a determining means determining whether the other vehicle is in the path of the own vehicle, based on the parameter, an acquisition means acquiring a lane width that is the width of the lane the own vehicle is traveling, and an adjustment means changing the correspondence between the relative position and the parameter, based on the lane width.

5 Claims, 9 Drawing Sheets

(51) Int. Cl.
*B60W 30/16* (2012.01)
*B60W 30/095* (2012.01)
*G08G 1/16* (2006.01)

(52) U.S. Cl.
CPC ....... *B60W 30/095* (2013.01); *B60W 2420/42* (2013.01); *B60W 2420/52* (2013.01); *B60W 2550/308* (2013.01); *G08G 1/167* (2013.01)

VEHICLE CONTROL APPARATUS

CROSS-REFERENCE TO RELATED APPLICATION

This application is based on and claims the benefit of priority from earlier Japanese Patent Application No. 2014-242234 filed on Nov. 28, 2014 the descriptions of which is incorporated herein by reference.

TECHNICAL FIELD

The present disclosure relates to a vehicle control technique mounted to a vehicle for detecting other vehicle ahead of the vehicle.

BACKGROUND ART

Vehicle control apparatuses that are conventionally known use search waves such as millimeter waves when controlling the vehicles equipped with the devices. Specifically, such a vehicle control apparatus transmits millimeter waves over a predetermined angular range around the own vehicle, detects the reflected waves to detect the location of other vehicle, and controls the own vehicle to follow the detected other vehicle.

This type of vehicle control apparatus is disclosed in PTL 1. The vehicle control apparatus disclosed in PTL 1 detects other vehicles traveling in the own lane (the lane which the own vehicle is traveling) and an adjacent lane (a lane adjacent to the own lane), and determines whether other vehicle traveling in the adjacent lane has entered the own lane. The vehicle control apparatus disclosed in PTL 1 also determines whether other vehicle traveling in the own lane has departed from the own lane. In this case, when the other vehicle traveling in the own lane moves in a lateral direction and starts a behavior of departing from the own lane, early departure of the other vehicle from the detection range is prompted by reducing the width of detecting the position of the other vehicle. On the other hand, when other vehicle traveling in an adjacent lane moves in a lateral direction to enter the own lane, early entry of the other vehicle into the detection range is prompted by increasing the width of detecting the position of the other vehicle.

CITATION LIST

Patent Literature

[PTL 1] U.S. Pat. No. 6,094,616 B

SUMMARY OF THE INVENTION

Technical Problem

The vehicle control apparatus disclosed in PTL 1 detects other vehicle traveling in the own lane. However, when the lane width is unusually small, other vehicle traveling in an adjacent lane may be determined as traveling in the own lane.

Figure 9A:
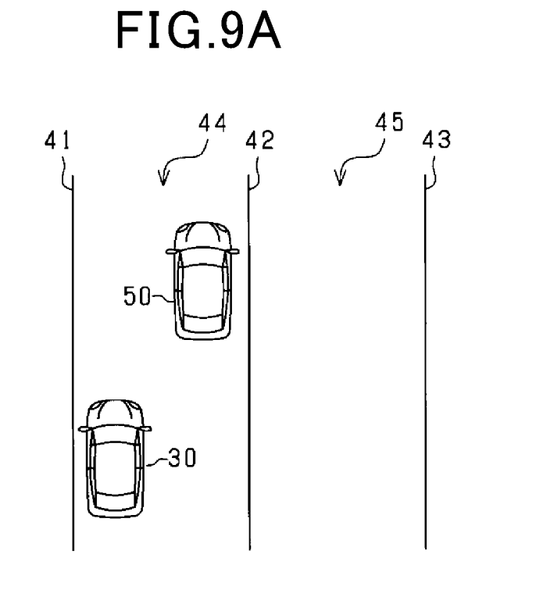
FIG. 9A shows a positional relationship between an own vehicle and other vehicle traveling in the same lane with a large width.
Figure 9B:
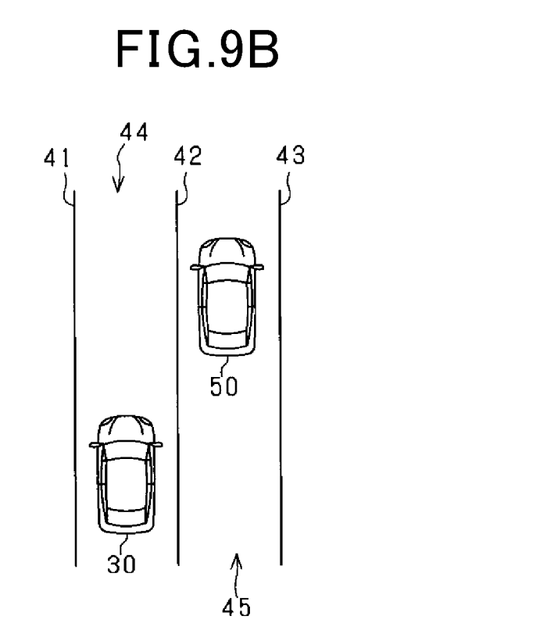
FIG. 9B shows a positional relationship between an own vehicle traveling in an own lane and other vehicle traveling in an adjacent lane, both lanes being narrow.

This will be explained more specifically using FIGS. 9A and 9B. FIG. 9A shows a positional relationship between an own vehicle 30 and other vehicle 50 traveling in the same lane with a large width. FIG. 9B shows a positional relationship between an own vehicle 30 traveling in an own lane 44 and other vehicle 50 traveling in an adjacent lane 45, both lanes being narrow.

In the example shown in FIG. 9A, the own vehicle 30 is traveling in the own lane 44 defined between a first lane separator line 41 and a second lane separator line 42, while the other vehicle 50 is also traveling in the own lane 44. In this case, following control is exerted over the own vehicle 30 with the other vehicle 50 being determined to be a preceding vehicle.

In the example shown in FIG. 9B, the own vehicle 30 is traveling in the own lane 44 defined between the first and second lane separator lines 41 and 42, while the other vehicle 50 is traveling in the adjacent lane 45 defined between the second lane separator line 42 and a third lane separator line 43. Since the lanes have a small width, relative positions of the own vehicle 30 and other vehicle 50 in a lateral direction are similar to those in the example shown in FIG. 9A. Thus, following control is exerted over the own vehicle 30, with the other vehicle 50 traveling in the adjacent lane 45 being determined to be a preceding vehicle.

An object of the present disclosure is to provide a vehicle control technique that can prevent erroneous detection of other vehicle that is not in the path of the own vehicle.

Solution to Problem

The present disclosure is a vehicle control apparatus mounted to an own vehicle to control the own vehicle according to a position of other vehicle ahead of the own vehicle. The apparatus includes a setting means, a determining means, an acquisition means, and an adjustment means. The setting means sets a parameter indicating a position of the other vehicle relative to the own vehicle in a lateral direction perpendicular to a path of the own vehicle. The determining means determines whether the other vehicle is in the path of the own vehicle, based on the parameter. The acquisition means acquires a lane width that is a width of a lane the own vehicle is traveling. The adjustment means changes correspondence between the relative position and the parameter, based on the lane width.

The vehicle control apparatus of the present disclosure correlates the position of other vehicle relative to the own vehicle in a lateral direction perpendicular to the path of the own vehicle, with a parameter indicating whether the other vehicle is in the path of the own vehicle, so that whether the other vehicle is in the path, of the own vehicle can be determined based on the relative position of the other vehicle. Thus, the vehicle control apparatus of the present disclosure can determine whether the other vehicle is in the path of the own vehicle, based on the parameter correlated to the relative position of the other vehicle. On a road with lanes of an unusually small width, there is a probability that other vehicle traveling in a lane (adjacent lane) adjacent to the lane town lane) the own vehicle is traveling is selected as a preceding vehicle. In this regard, the vehicle control apparatus of the present disclosure with the above configuration acquires the lane width and changes the correspondence between the position of other vehicle relative to the own vehicle, and the parameter indicating whether the other vehicle is in the path of the own vehicle, based on the acquired lane width. Thus, when the lane width is small, the vehicle control apparatus of the present disclosure can prevent other vehicle traveling in an adjacent lane from being determined, to be in the path of the own vehicle. That is, the vehicle control apparatus of the present disclosure can prevent erroneous detection of other vehicle that is not in the path of the own vehicle.

DESCRIPTION OF THE EMBODIMENTS

Some embodiments will be described hereinafter with reference to the drawings. The same or equivalent parts in the embodiments described below are assigned with the same reference signs in the drawings, and an earlier description should be referred regarding those parts which are assigned with the same reference signs.

First Embodiment

A first embodiment of the present disclosure will be described with reference to the drawings. A vehicle control apparatus provided with an object detecting device is mounted to a vehicle, with an ACC (adaptive cruise control) function being imparted. The vehicle control apparatus uses the ACC function to allow the own vehicle to perform following travel in such a way that the distance between the own vehicle and other vehicle detected by the object detecting device becomes a target inter-vehicle distance suitable for the vehicle speed. When other vehicle is not detected, the vehicle control apparatus controls the own vehicle to travel at a set target speed.

Figure 1:
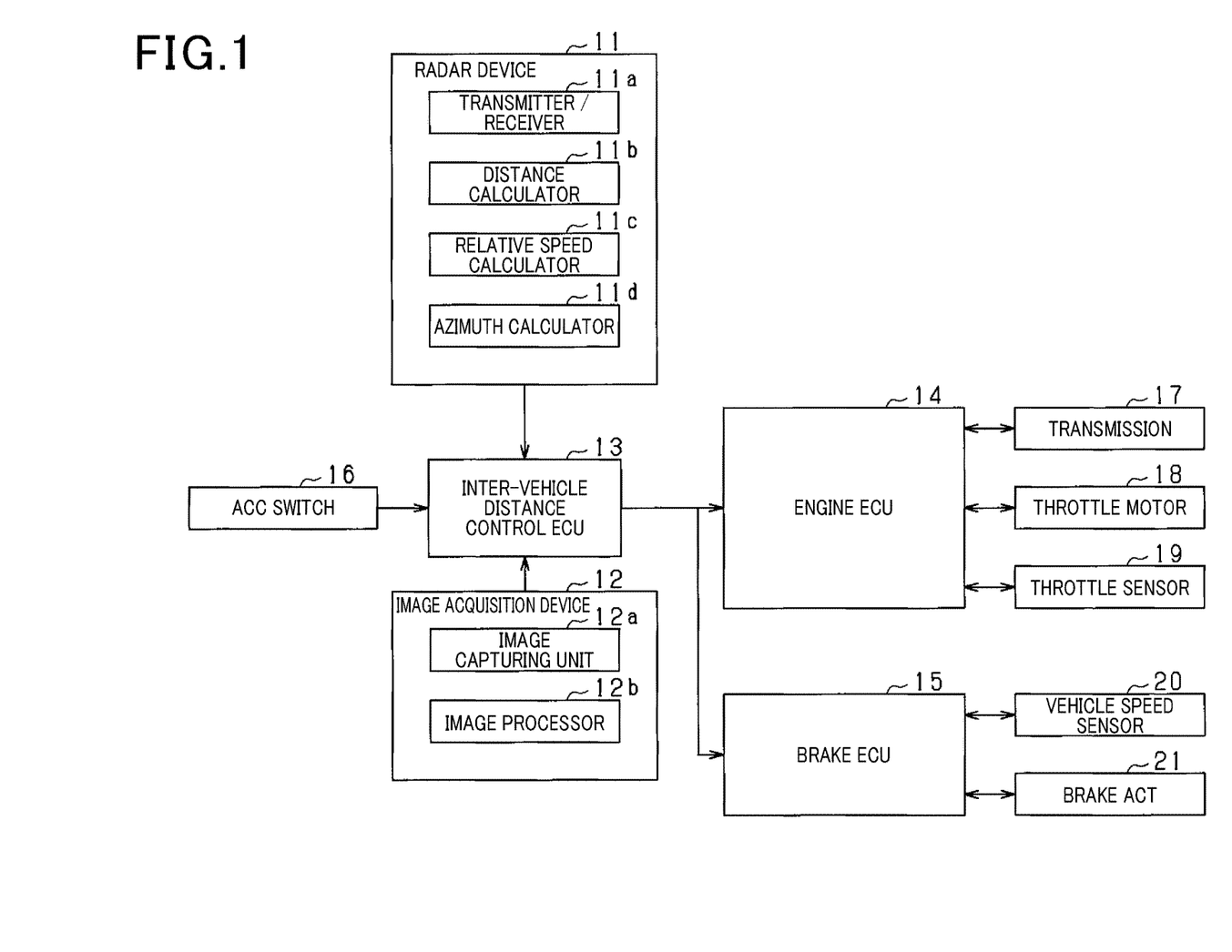
FIG. 1 is a general configuration diagram illustrating a vehicle control apparatus.

In FIG. 1, the vehicle control apparatus of the present embodiment includes a radar device 11, an image acquisition device 12, an inter-vehicle distance control ECU 13, an engine ECU 14, and a brake ECU 15. In the vehicle control apparatus, the inter-vehicle distance control ECU 13 serves as an object detecting device using information obtained from the radar device 11 and the image acquisition device 12, and cooperates with the engine ECU 14 and the brake ECU 15 to control the inter-vehicle distance.

The radar device 11 and the image acquisition device 12 are connected to the ECUs 13 to 15 via an on-vehicle network so that they can communicate with each other. The inter-vehicle distance control ECU 13 is connected to an ACC switch 16. The engine ECU 14 is connected to a transmission 17, a throttle motor 18, and a throttle sensor 19. The brake ECU 15 is connected to a vehicle speed sensor 20 and a brake ACT (actuator) 21. These devices are connected via a dedicated line used such as for serial communication.

The radar device 11, the image acquisition device 12, and the ECUs 13 to 15 are information processors each including components such as a microcomputer and a wire harness interface. The microcomputer includes components, such as CPU, ROM, RAM, I/O port, and CAN communication device.

The radar device 11 detects a distance, a relative speed, and a relative position for each of other vehicles and provides the detected results to the inter-vehicle distance control ECU 13. The image acquisition device 12 includes an image capturing means for capturing an image such as of an object. The image acquisition device 12 captures an image of the surroundings of the own vehicle to apply predetermined processing to the captured image, and provides the processing results to the inter-vehicle distance control ECU 11.

The inter-vehicle distance control ECU 13 uses, as, a basis, information on other vehicle, current speed, current acceleration, etc., transmitted from the radar device 11 and the image acquisition device 12 to thereby transmit an acceleration instruction for instructing an acceleration of the own vehicle to the engine ECU 14 and the brake ECU 15.

The ACC switch 16 receives the driver's manipulation of ACC. Upon reception of the manipulation, the inter-vehicle distance control ECU 13 transmits an acceleration instruction to the engine ECU 14 and the brake ECU 15. The driver's manipulation of ACC includes switching on/off of ACC, switching between a mode maintaining a predetermined inter-vehicle distance and a mode maintaining a predetermined vehicle speed, and instructing a vehicle speed.

The engine ECU 14 controls the throttle motor 18 while monitoring the throttle opening detected by the throttle sensor 19. For example, based on table data in which throttle openings are correlated to vehicle speeds and acceleration instructions, the engine ECU 14 determines the throttle opening according to the acceleration instruction received from the inter-vehicle distance control ECU 13 and the current speed. Also, the engine ECU 14 determines whether gear shifting is necessary (necessity of gear shifting) based on the vehicle speed and the throttle opening. If necessary, the engine ECU 14 instructs the transmission 17 to set a gear position.

The brake ECU 15 applies braking to the own vehicle by controlling the valve opening/closing and valve position of the brake ACT 21. The brake ACT 21 controls the acceleration (or deceleration) of the own vehicle by increasing, maintaining, or reducing the wheel cylinder pressure of each wheel using a pressure produced by a pump in a working fluid (e.g., oil). The brake ECU 15 applies braking to the own vehicle according to the acceleration instruction sent from the inter-vehicle distance control ECU 13.

For example, the radar device 11 transmits a millimeter-band high frequency signal and detects the position of an object within a detection range that is a region falling in a predetermined detection angle in a forward direction of the own vehicle. Specifically, the radar device 11 includes a transmitter/receiver 11a and a distance calculator 11b. The transmitter/receiver 11a transmits search waves, and receives the reflected waves with a plurality of antennas. The distance calculator 11b calculates the distance between the own vehicle and other vehicle. Further, the radar device 11 includes a relative speed calculator 11c and an azimuth calculator 11d. The relative speed calculator 11e calculates the relative speed of the own vehicle and other vehicle. The azimuth calculator 11d calculates the azimuth of other vehicle with respect to the own vehicle. The distance calculator 11b calculates the distance between the own vehicle and other vehicle based on the transmission time point of the search waves and the reception time point of the reflected waves. The relative speed calculator 11c calculates a relative speed based on the frequency of the waves reflected by other vehicle (the frequency that has been changed by Doppler effect). The azimuth calculator 11*d* calculates the azimuth of other vehicle based on the phase difference of the reflected waves received by the plurality of antennas. It should be noted that the radar device 11 can specify the position of other vehicle relative to the own vehicle if the location and the azimuth of the other vehicle can be calculated. The radar device 11 periodically transmits search waves towards other vehicle and, periodically receives the reflected waves from the other vehicle. Also, the radar device 11 periodically calculates the reflection position at which the search waves have been reflected and, periodically calculates the relative speed between the own vehicle and other vehicle. As a result, the radar device 11 sends information including at least a reflection position (position based on the reflected waves) as first detection information, to the inter-vehicle distance control ECU 13.

The image acquisition device 12 includes an imager 12*a* (imaging means). The imager 12*a* is a single-lens imaging device, such as a CCD camera, CMOS image sensor, or near-infrared camera. The imager 12*a* is mounted to the vehicle so as to be located at the center of the vehicle in the vehicle width direction at a predetermined level to capture a bird's eye view image of an area ahead of the vehicle, spreading at a predetermined angle (the detection range of the radar device 11). An image processor 12*b* extracts feature points (feature points indicating presence of other vehicle) from the image captured by the imager 12*a*. Specifically, the image processor 12*b* extracts edge points from the image on the basis of the luminance information of the image and performs Hough transform for the extracted edge points. In the Hough transform, points extracted as feature points include, for example, points on a straight line that are a plurality of successive edge points, or points at each of which straight lines cross at right angles. It should be noted that the image acquisition device 12 captures an image and extracts feature points at a control cycle that is the same as or different from that of the radar device 11. As a result, the image acquisition device 12 sends information, including at least the results of feature point extraction (positions based on the captured image within the detection range), as second detection information to the inter-vehicle distance control ECU 13.

Figure 2:
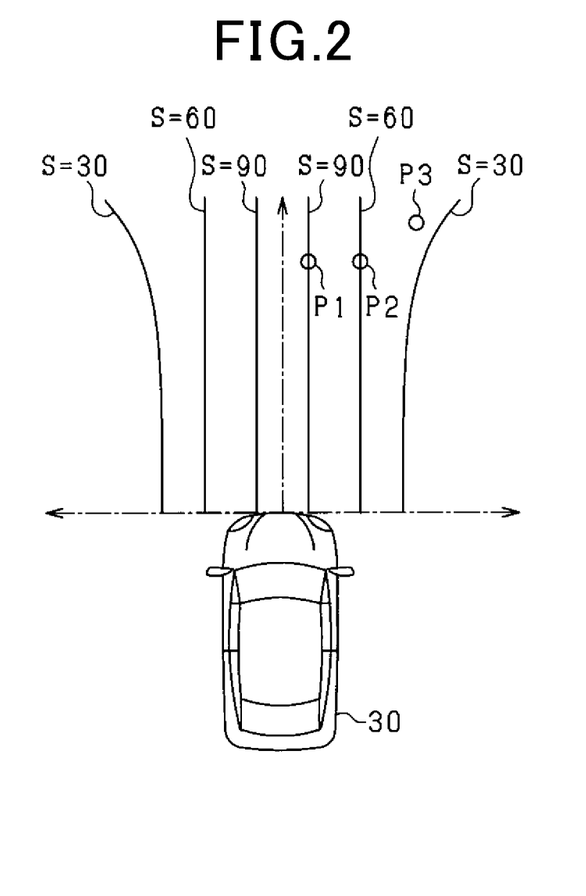
FIG. 2 is a diagram illustrating a probability map.

Next, processing performed by the inter-vehicle distance control ECU 13 of the present embodiment will be described processing for determining whether other vehicle is present in the own lane). For each of other vehicles in the traveling direction of the own vehicle, the inter-vehicle distance control ECU 13 uses an own lane probability S as a parameter for determining whether other vehicle is present in the lane which the own vehicle is traveling. Referring to FIG. 2, the own lane probability S will be described.

In the present embodiment, a probability map is set as a determination region, extending over a predetermined range on a virtual plane (virtual coordinate space) in front of the own vehicle 30 in the traveling direction to correlate other vehicles with the own lane probabilities S. The determination region is used for determining whether other vehicle is present in the path of the own vehicle 30. The probability map is designed to be located within a range detectable by the radar device 11. Own lane probabilities S are correlated with positions (coordinates) on the probability map. The inter-vehicle distance control ECU 13 maps the position of other vehicle relative to the own vehicle 30 into the coordinate space of the probability map to thereby determine the own lane probability S of the other vehicle with respect to the own vehicle 30. FIG. 2 shows an example of the probability map in which the own lane probabilities S ranging between 30 to 90 are correlated in the virtual coordinate space where relative positions of other vehicles ahead of the own vehicle 30 are indicated. As shown in FIG. 2, a higher own lane probability S (S=90) is set at position closer to the path of the own vehicle 30 (closer to the centerline of the own lane), and the set value gradually decreases at position farther from the path of the own vehicle 30 in a lateral direction. In this way, the inter-vehicle distance control ECU 13 serves as a setting means that sets a parameter indicating a position of other vehicle relative to the own vehicle 30 in a lateral direction perpendicular to the path of the own vehicle 30.

The own lane probability S on the probability map is set so as to gradually decrease at position farther from the path of the own vehicle 30 in a lateral direction perpendicular to the path of the own vehicle 30. Also, the own lane probability S is set such that the range of correlated positions is partially enlarged more at position farther from the own vehicle 30. The reason for the above settings is that at position farther from the own vehicle 30, the error in the position of the object detected by the radar device 11 increases more. The inter-vehicle distance control ECU 13 calculates the own lane probability S of the detected other vehicle based on the position of the other vehicle and the set probability map, and then compares the calculated own lane probability S with a predetermined threshold Th. Then, when the own lane probability S is equal to or greater than the threshold Th, the inter-vehicle distance control ECU 13 selects the other vehicle detected by the radar device 11 as a preceding vehicle for use in the following control of the own vehicle 30. When the own lane probability S is smaller than the threshold Th, the inter-vehicle distance control ECU 13 deselects the other vehicle detected by the radar device 11 if the other vehicle has already been selected as a preceding vehicle for use in the following control of the own vehicle 30. FIG. 2 shows positions acquired in the cases of the own lane probabilities S being 90, 60 and 30. In fact, the own lane probability S is designed to have a plurality of levels in which the probability is incremented/decremented on a basis of 1, for example, with each level being imparted with a predetermined width in a lateral direction (hereinafter referred to as zone width). That is, the own lane probability S is designed to be incremented/decremented stepwise, being correlated with a predetermined lateral zone width on the virtual coordinate space where relative positions of other vehicles ahead of the own vehicle 30 are indicated. If the position of other vehicle falls within a zone width, the own lane probability S of that zone width is correlated to the other vehicle. It should be noted that the reference value of each zone width (hereinafter referred to as reference width) is determined in advance based on a typical lane width of a road, such as a highway, where following control is assumed to be exerted over a preceding vehicle.

For example, on the probability map shown in FIG. 2, when the position of other vehicle is detected at a position P1 near the path of the own vehicle 30 (near the centerline of the own lane), the own lane probability S is 90. When the position of other vehicle is detected at a position P2 shifted in a lateral direction from the path of the own vehicle 30, the own lane probability S is 60. When the position of other vehicle is detected at a position P3 shifted further in a lateral direction from the path of the own vehicle 30, the own lane probability S is about 40. In this situation, when the threshold Th is set to 50, for example, the other vehicle at the position P1 or P2 is selected as a preceding vehicle since the own lane probability S is equal to or greater than the threshold Th (S≥50). The other vehicle at the position P3 is not selected as a preceding vehicle since the own lane probability S is below the threshold Th (S<50) (the vehicle, if it has been selected as a preceding vehicle, is deselected). Thus, since other vehicle traveling in the same lane as the own vehicle 30 is required be selected as a preceding vehicle, the own lane probability S is designed to become equal to or greater than the threshold Th when other vehicle traveling in a lane of a standard width is detected. That is, the threshold Th is determined such that the range in which the own lane probability S becomes equal to or greater than the threshold Th is inside the lane width, and the range in which the own lane probability S becomes smaller than the threshold Th is outside the lane width.

Although specific values of the own lane probability S are shown on the probability map of FIG. 2, these are merely examples. That is, any probability map may be used as long as the own lane probabilities S are set such that other vehicle is more likely to be selected as a preceding vehicle as the position of the other vehicle relative to the own vehicle 30 in the lateral direction becomes closer to the path of the own vehicle 30 (the centerline of the own lane).

When the probability map shown in FIG. 2 is used to determine whether other vehicle should be selected as a preceding vehicle, on a road on which the lanes have an unusually small width, the other vehicle is unavoidably be selected as a preceding vehicle, although the vehicle is traveling in a lane (adjacent lane) adjacent to the lane (own lane) which the own vehicle 30 is traveling. For example, in FIG. 2, if the width of the own lane is one that makes the own lane probability S be equal to or greater than 60, the position of other vehicle traveling in an adjacent lane, if detected, may have the own lane probability S of equal to or greater than the threshold Th (S≥50). That is, if the position of other vehicle is detected at the position P2 of FIG. 2, the own lane probability S becomes 60 in spite of the fact that the detected other vehicle is traveling in the adjacent lane, and the other vehicle traveling in the adjacent lane is selected as a preceding vehicle. As a result, the following control of the own vehicle 30 is exerted over the other vehicle traveling in the adjacent lane, deteriorating the accuracy of the vehicle control.

Figure 3:
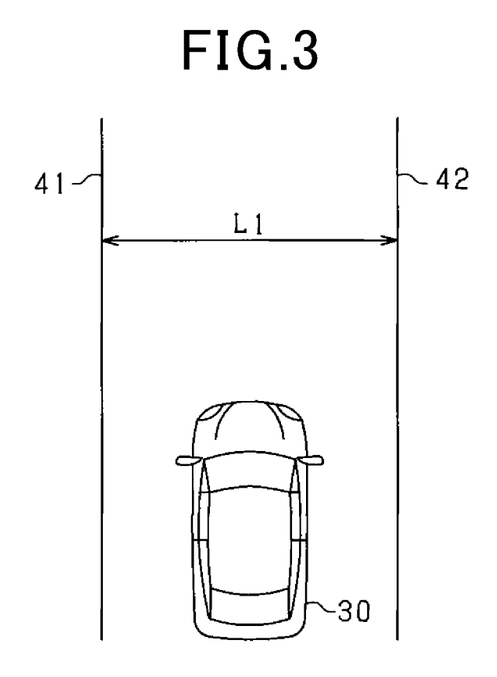
FIG. 3 is a diagram illustrating a relationship between an own vehicle, a white line, and a lane width.

In view of the above, the probability map, in the present embodiment is corrected according to the lane width. In particular, feature points are extracted based on the luminance information of an image (image of the road) captured by the image capturing unit 12a to recognize a white line (lane separator line) drawn on the road ahead of the own vehicle 30. As shown in FIG. 3, in the case where both of a left white line 41 and a right white line 42 are detected in the lane (own lane) which the own vehicle 30 is traveling, a lane width L1 that is a distance between the left and right white lines 41 and 42 is calculated. The lane width L1 may be calculated, for example, by obtaining widths of the lane at several positions and averaging the plurality of widths, or may be a width of the lane at a position away from the own vehicle 30 by a predetermined distance.

The probability map is corrected using the lane width L1 by reducing each zone width, which is correlated with the own lane probability S on the probability map, in a lateral direction perpendicular to the path of the own vehicle 30. With this correction, the own lane probability S using the corrected probability map becomes to than the own lane probability S using the probability map before correction, even when the position of the other vehicle relative to the own vehicle 30 remains unchanged. As a result, when the corrected probability map is used, the other vehicle will be less likely to be selected as a preceding vehicle even when the position of the other vehicle relative to the own vehicle 30 remains unchanged.

Figure 4:
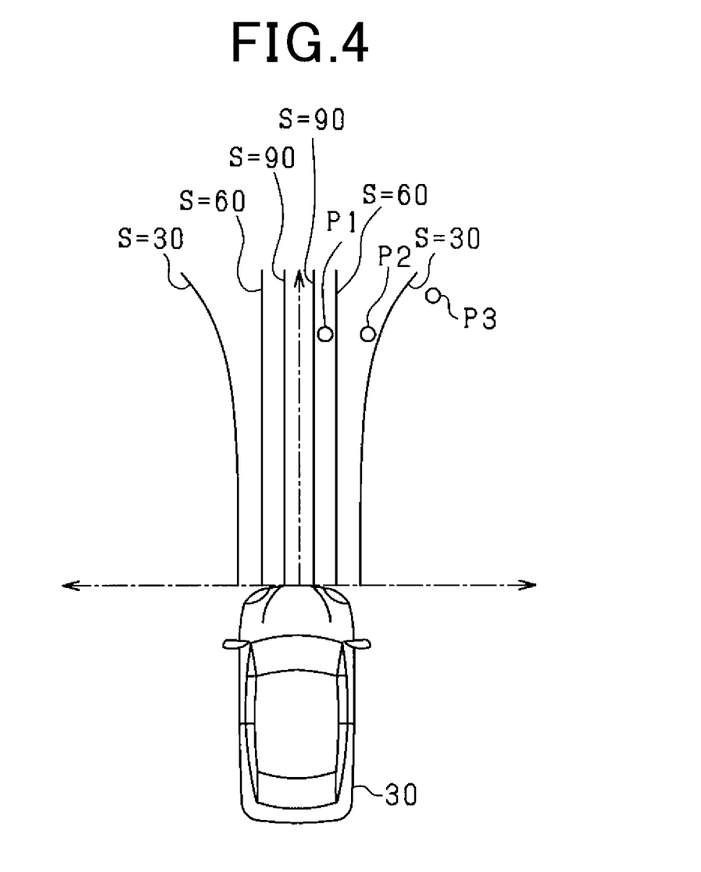
FIG. 4 is a diagram illustrating a corrected probability map.

FIG. 4 shows an example of a probability map corrected using die lane width L1. As described above, the zone width of the own lane probability S on the probability map is reduced in a lateral direction perpendicular to the path of the own vehicle 30. Assuming that other vehicles are detected at the same positions as the positions P1 to P3 of FIG. 2, the own lane probability S at the position P1 is about 75, and the own lane probability S at the position P2 is about 40. Thus, if other vehicle is detected at the position P2, the own lane probability S is smaller than the threshold Th (S<50), and the detected other vehicle will not be selected as a preceding vehicle.

Figure 5:
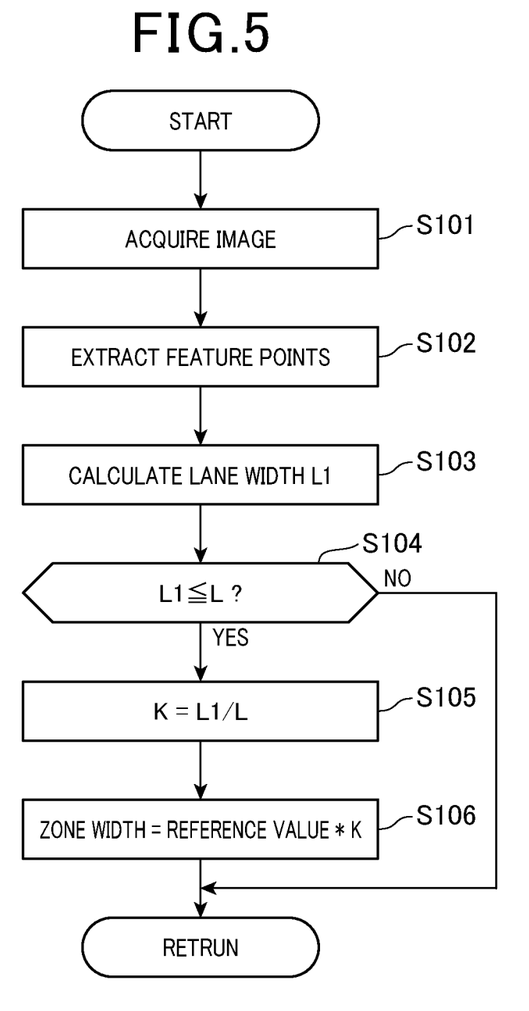
FIG. 5 is a flow diagram illustrating a process according to a first embodiment.

FIG. 5 is a flow diagram illustrating a process performed by the inter-vehicle distance control ECU 13 of the present embodiment. The process of FIG. 5 is repeated at a predetermined control cycle.

The inter-vehicle distance control ECU 13 of the present embodiment first acquires an image (image of the road) captured by the image capturing unit 12a (S101), and extracts feature points of white lines (lane separator lines) from the luminance information, etc. of the image to recognize the white lines (S102). When the white lines are recognized, the inter-vehicle distance control ECU 13 calculates the lane width L1 which is the length between the left and right white lines 41 and 42 (S103). At this point, the inter-vehicle distance control ECU 13 serves as an acquisition means acquiring the lane width L1 of the lane which the own vehicle 30 is traveling (own lane). As described above, the lane width L1 may be calculated, for example, by obtaining widths at several positions of the lane and averaging the obtained widths, or may be a width of the lane at a position away from the own vehicle 30 by a predetermined distance. Also, the processing steps of S101 and S102 may be carried out by the image processor 12b of the image acquisition device 12.

The inter-vehicle distance control ECU 13 determines whether the calculated lane width L1 is equal to or smaller than a reference width L (S104). It should be noted that the reference width L is a value determined in advance based on a typical lane width of a road, such as a highway, where following control is assumed to be exerted over the preceding vehicle.

When it is determined that the lane width L1 is larger than the reference width L (NO in S104), the inter-vehicle distance control ECU 13 terminates the sequence of processing steps. If it is determined that the lane width L1 is equal to or smaller than the reference width L (YES in S104), the inter-vehicle distance control ECU 13 calculates a correction coefficient K used for correcting the zone width of the own lane probability S on the probability map (S105). The correction coefficient K is calculated by dividing the lane width L1 by the reference width L. The inter-vehicle distance control ECU 13 multiplies a reference value of each zone width of the own lane probability S by the calculated correction coefficient K to calculate each corrected zone width, and thus corrects the zone widths of the own lane probabilities S on the probability map (S106). Then, the inter-vehicle distance control ECU 13 terminates the sequence of processing steps. As described above, the inter-vehicle distance control ECU 13 serves as an adjustment means adjusting the zone widths of the own lane probabilities S on the probability map, based on the lane width L1. In other words, the inter-vehicle distance control ECU 13 serves as an adjustment means that uses the lane width L1 as a basis to change the correspondence of the position of other vehicle relative to the own vehicle 30, with the parameter indicating whether the other vehicle is in the path of the own vehicle 30.

After performing the processing steps shown in the flow diagram of FIG. 5, the inter-vehicle distance control ECU 13 calculates the own lane probability S of the other vehicle with respect to the own vehicle 30, based on the corrected probability map and the position of the other vehicle relative to the own vehicle 30. Then, the inter-vehicle distance control ECU 13 determines whether the calculated own lane probability S is equal to or greater than the threshold Th. According to the result of the determination, the inter-vehicle distance control ECU 13 selects the other vehicle as a preceding vehicle or excludes the vehicle from targets of selection. In this way, the inter-vehicle distance control ECU 13 serves as a determining mean determining whether other vehicle is in the path of the own vehicle 30 using a set parameter.

The vehicle control apparatus according to the present embodiment provides the following advantageous effects with the above configuration.

The vehicle control apparatus of the present embodiment finds the position of other vehicle relative to the own vehicle 30 in a lateral direction perpendicular to the path of the own vehicle 30. The relative position of the other vehicle is correlated with a parameter indicating whether other vehicle is in the path of the own vehicle 30. Based on the correlated relative position of the other vehicle, the vehicle control apparatus is able to determine whether the other vehicle is in the path of the own vehicle 30. More specifically, the vehicle control apparatus of the present embodiment uses the probability map in which the position of other vehicle relative to the own vehicle 30 is correlated with the own lane probability S that is a parameter indicating whether other vehicle is in the path of the own vehicle 30. In the probability map of the present embodiment, the own lane probability S is designed to have a plurality of levels. Each level of the own lane probability S designed in this way is imparted with a lateral zone width perpendicular to the path of the own vehicle 30. Thus, by mapping the position of other vehicle relative to the own vehicle 30 in the coordinate space of the probability map in the present embodiment, the position of the other vehicle can be correlated with an own lane probability S. In this way, based on the own lane probability S correlated with the position of the other vehicle, the vehicle control apparatus of the present embodiment can determine whether the other vehicle is a preceding vehicle in the path of the own vehicle 30. On a road with lanes of an unusually small width, there is a probability that other vehicle traveling in a lane (adjacent lane) adjacent to the lane (own lane) the own vehicle 30 is traveling is selected as a preceding vehicle. In this regard, the vehicle control apparatus of the present embodiment obtains the lane width L1 and uses the lane width L1 as a basis along with the reference width L to change the zone width of each own lane probability S on the probability map. That is, based on the obtained lane width L1, the vehicle control apparatus of the present embodiment changes the correspondence of the position of other vehicle relative to the own vehicle 30, with the parameter indicating whether other vehicle is in the path of the own vehicle 30. Thus, when the lane width L1 is small, the vehicle control apparatus of the present embodiment can prevent other vehicle traveling in an adjacent lane from being determined to be in the path of the own vehicle 30. In other words, the vehicle control apparatus of the present embodiment can prevent erroneous detection of other vehicle that is not in the path of the own vehicle 30.

Second Embodiment

The vehicle control apparatus of the present embodiment generally has the same configuration as the vehicle control apparatus of the first embodiment, but differs in a part of the control performed by the inter-vehicle distance control ECU 13.

In this embodiment, as in the first embodiment, the radar device 11 (first position detecting means) and the image acquisition device 12 (second position detecting means) acquire the position information of other vehicle. The radar device 11 calculates the position of other vehicle by receiving the reflected waves from the other vehicle. The image acquisition device 12 calculates the position of other vehicle by acquiring feature points of the captured image of the other vehicle.

The reflection position (first position) is calculated by the radar device 11, based on the transmission time and reception time of the radar wave. Thus, the radar device 11 can accurately calculate the position of other vehicle. However, the reflected waves received and used by the radar device 11 for the calculation of the position may be those which have been reflected at the rear center part of other vehicle, or may be those which have been reflected at a part other than a rear part of other vehicle (e.g., left or right edge). This can result in causing deviation in the position calculated by the radar device 11.

The image acquisition device 12 can accurately determine the presence of other vehicle by extracting feature points from a captured image. However, in the image acquisition device 12, the image capturing unit 12a is attached at a predetermined height to capture a bird's eye view image of other vehicle from the attached position. Feature points of the other vehicle are extracted from the captured bird's eye view image. Thus, the positions of the feature points of the captured image may deviate from their actual positions, even if the positions of the feature points are corrected in the image acquisition device 12, based on the attached positron of the image capturing unit 12a. It is true that the image acquisition device 12 can accurately determine the presence of other vehicle; however, an image position (second position), which is the position of the other vehicle calculated from the feature points of the captured image, may deviate from the actual position of the other vehicle.

Accordingly, if the value indicating deviation is small between the reflection position calculated by the radar device 11 and the image position calculated by the image acquisition device 12 (hereinafter referred to as deviation), there is a high probability that other vehicle is present at that position. In the present embodiment, a state where the deviation is small is referred to as the state of fusion. In other words, a state in which the radar device 11 and the image acquisition device 12 acquire the position of other vehicle with high accuracy is referred to as the state of fusion.

In the present embodiment, when the state is determined to be fusion, the position obtained based on the reflection position and the image position at that time is taken to be a fusion position. Using the fusion position along with the probability map, a fusion probability is obtained. The fusion probability is obtained by using a means (method) similar to that used for obtaining the own lane probability S described in connection with the first embodiment.

On the other hand, when the reflection position and the image position are deviated from each other and the state is determined not to be fusion, a millimeter wave probability is obtained using the reflection position at that time and the probability map. The millimeter wave probability is obtained by using a means (method) similar to that used for obtaining the own lane probability S described in connection with the first embodiment.

Figure 6A:
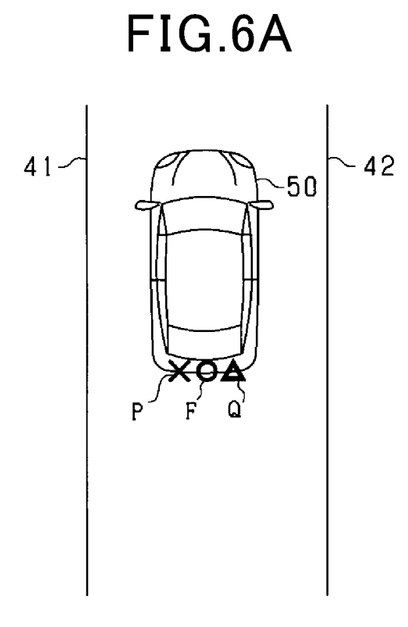
FIG. 6A is a diagram illustrating a fusion state.
Figure 6B:
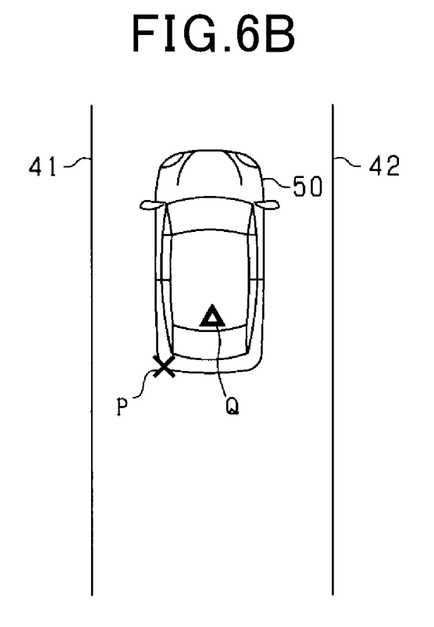
FIG. 6B is a diagram illustrating a non-fusion state.

FIG. 6A shows an example of a reflection position P and an image position Q of other vehicle 50 in the state of fusion, and FIG. 6B shows an example of the reflection position P and the image position Q of the other vehicle 50 not in the state of fusion. In the case of FIG. 6A, the state is determined to be fusion because the reflection position P and the image position Q of the other vehicle 50 are close to each other (deviation is small). Thus, in the vehicle control apparatus of the present embodiment, a fusion position F is calculated based on the reflection position P and the image position Q, and a fusion probability is calculated based on the calculated fusion position F and the set probability map. In the case of FIG. 6B, the state is not determined to be fusion because the deviation between the reflection position P and the image position Q of the other vehicle 50 is equal to or greater than a predetermined length (deviation is large). Thus, in the vehicle control apparatus of the present embodiment, a millimeter wave probability is calculated based on the reflection position P and the probability map.

Figure 7:
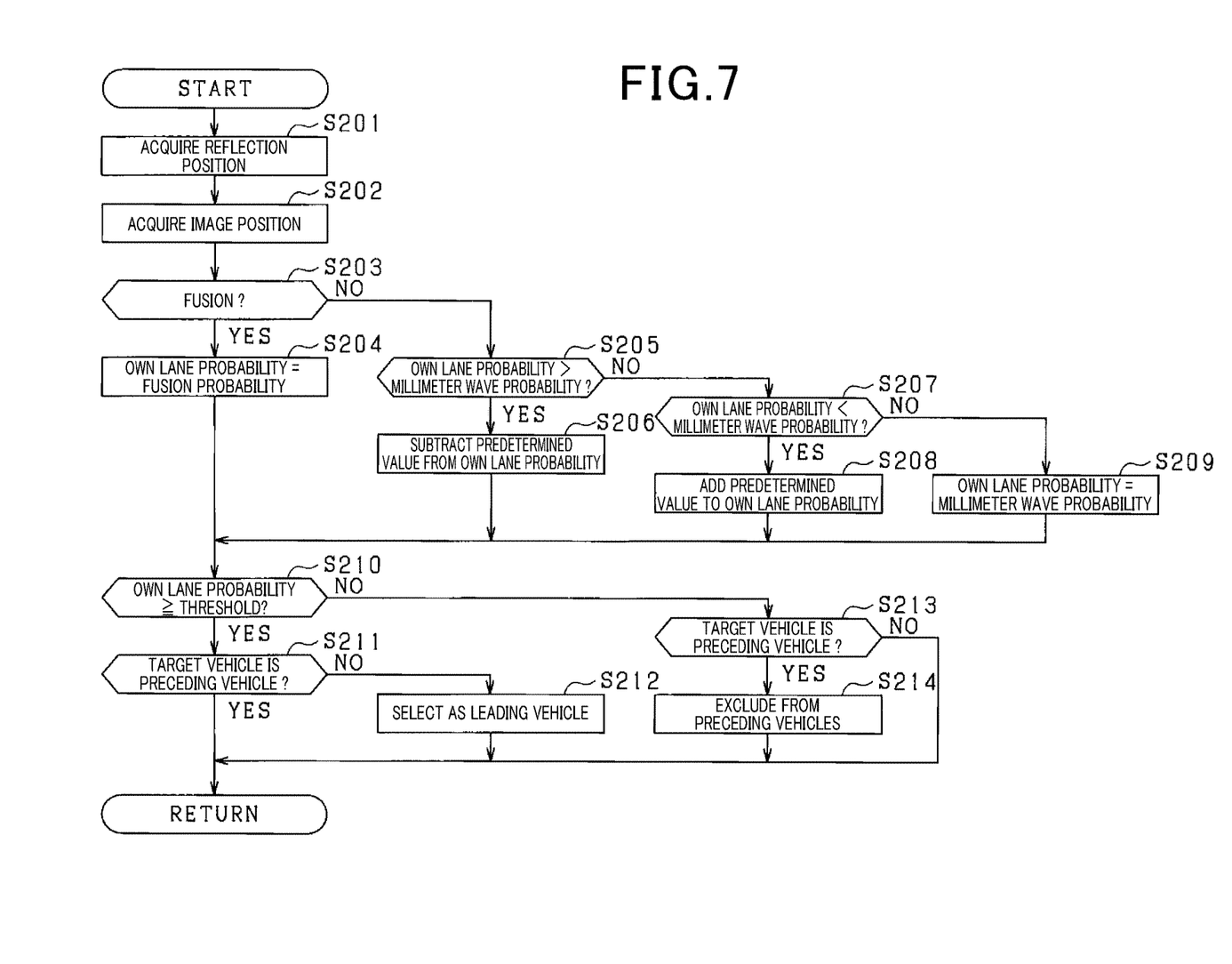
FIG. 7 is a flow diagram illustrating a process according to a second embodiment.

FIG. 7 is a flow diagram showing the sequence of processing steps performed by the inter-vehicle distance control ECU 13 of the present embodiment. The processing steps of FIG. 7 are repeated at a predetermined control cycle.

The inter-vehicle distance control ECU 13 of the present embodiment first acquires information on the reflection position P from the radar device 11 (S201), and acquires information on the image position Q from the image acquisition device 12 (S202). The inter-vehicle distance control ECU 13 determines whether the state is fusion, based on the result of determination of whether the deviation between the acquired reflection position P and the image position Q is smaller than the predetermined length (whether the deviation is smaller than a predetermined value) (S203). If the state is determined to be fusion (YES in S203; the deviation is smaller than a predetermined value), the inter-vehicle distance control ECU 13 uses the fusion probability as the own lane probability S (S204). In this case, the inter-vehicle distance control ECU 13 calculates a fusion position F, based on the reflection position P and the image position Q, and calculates a fusion probability, based on the calculated fusion position F and the set probability map.

If the state is determined not to be fusion (NO in S203; the deviation is equal to or greater than a predetermined value), the inter-vehicle distance control ECU 13 acquires the own lane probability S and the millimeter wave probability of the previous control cycle, and determines whether the own lane probability S of the previous control cycle is larger than the millimeter wave probability of the previous control cycle (S205). When the state is neat not fusion, the inter-vehicle distance control ECU 13 calculates a millimeter wave probability based on the reflection position P and the probability map. If it is determined that the own lane probability S is larger than the millimeter wave probability (YES in S205), the inter-vehicle distance control ECU 13 subtracts a predetermined value from the own lane probability S to approximate the own lane probability S to the millimeter wave probability (S206). If it is determined that the own lane probability S is equal to or smaller than the millimeter wave probability (NO in S205), the inter-vehicle distance control ECU 13 determines whether the own lane probability S is smaller than the millimeter wave probability (S207). If it is determined that the own lane probability S is smaller than the millimeter wave probability (YES in S207), the inter-vehicle distance control ECU 13 adds a predetermined value to the own lane probability S to approximate the own lane probability S to the millimeter wave probability (S208). If it is determined that the own lane probability S is equal to the millimeter wave probability (NO in S207), the inter-vehicle distance control ECU 13 uses the millimeter wave probability as the own lane probability S (S209). Thus, the present embodiment gradually changes the value of the own lane probability S to the value of the millimeter wave probability from the value of the fusion probability through the processing steps of S205 to S209. In the processing step of S206, if the own lane probability S after subtraction is smaller than the millimeter wave probability, the millimeter wave probability is used as the own lane probability S. In the processing step of S208, if the own lane probability S after addition is larger than the millimeter wave probability, the millimeter wave probability is used as the own lane probability S.

The inter-vehicle distance control ECU 13 compares the calculated own lane probability S with the threshold Th and determines whether the own lane probability S is equal to or greater than the threshold Th (S210). If it is determined that the calculated own lane probability S is equal to or greater than the threshold Th (YES in S210), the inter-vehicle distance control ECU 13 determines whether the target vehicle has already been selected as a preceding vehicle (S211). If it is determined that the target vehicle has already been selected as a preceding vehicle (YES in S211), the inter-vehicle distance control ECU 13 terminates the sequence of processing steps. If it is determined that the target vehicle has not been selected as a preceding vehicle (NO in S211), the inter-vehicle distance control ECU 13 selects that target vehicle as a preceding vehicle and terminates the sequence of processing steps (S212). Further, if it is determined that the calculated own lane probability S is smaller than the threshold Th (NO in S210), the inter-vehicle distance control ECU 13 determines whether the target vehicle has already been selected as a preceding vehicle (S213). If it is determined that the target vehicle has already been selected as a preceding vehicle (YES in S213), the inter-vehicle distance control ECU 13 excludes that target vehicle from preceding vehicles and terminates the sequence of processing steps (S214). If it is determined that the target vehicle has not been selected as a preceding vehicle (NO in S213), the inter-vehicle distance control ECU 13 terminates the sequence of processing steps. In this way, the inter-vehicle distance control ECU 13 serves as a parameter acquisition means acquiring an own lane probability S by performing the processing steps of S203 to S209 and using, as a basis, at least one of the reflection position P and the image position according to the deviation between the reflection position P and the image position Q.

Figure 8:
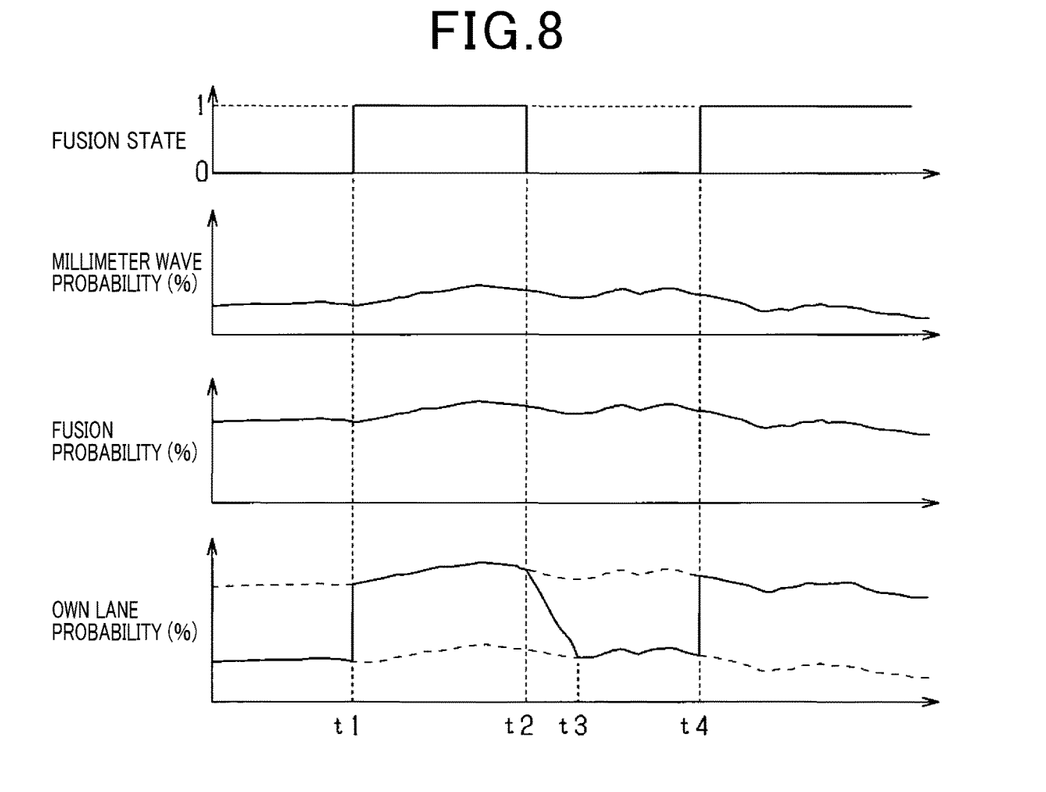
FIG. 8 is a time diagram illustrating the case where the process according to the second embodiment is executed.

FIG. 8 is a time diagram showing changes in the own lane probability S in the case where the processing steps of the above-described flow diagram are performed. FIG. 8 shows the case where the fusion position F is closer to the front position of the own vehicle 30 than the millimeter wave position is, and the fusion probability is higher than the millimeter wave probability. In FIG. 8, the initial state is not fusion. In the subsequent transition, the state of fusion is indicated by 1 and the state of non-fusion (the state that is not fusion) is indicated by 0. Further, in FIG. 8, the fusion probability and the millimeter wave probability are shown by dashed lines in showing the own lane probability S.

First, at time t1, the state is determined to be fusion because the deviation between the reflection position P and the image position Q is small. In this case, the value of the own lane probability S changes from the value of the millimeter wave probability to the value of the fusion probability. Then, at time t2, the deviation between the reflection position P and the image position Q increases and the state is determined not to be fusion (non-fusion). In this case, the value of the own lane probability S gradually changes to the value of the millimeter wave probability from the value of the fusion probability. The gradual change from the value of the fusion probability to the value of the millimeter wave probability continues until time t3 at which the value of the own lane probability S becomes equal to that of the millimeter wave probability. Then, at time t4, the state is determined to be fusion again. In this case, the value of the own lane probability S changes from the value of the millimeter wave probability to the value of the fusion probability.

Although FIG. 8 shows the case where the fusion probability is higher than the millimeter wave probability, when the fusion probability is smaller than the millimeter wave probability, a control is performed. The reason why a similar control is possible is that, when the reflection position P is closer to the front position of the own vehicle 30 than the fusion position F is, the millimeter wave probability calculated based on the reflection position P becomes higher than the fusion probability.

Thus, in the present embodiment, the following vehicle control apparatus can be configured.

The vehicle control apparatus of the present embodiment is mounted to an own vehicle 30 to control the own vehicle 30 according to the position of other vehicle 50 ahead of the own vehicle 30. The vehicle control apparatus of the present embodiment includes a radar device 11 serving as a first position detecting means. The radar device 11 transmits search waves, receives the reflected waves from the other vehicle 50, and acquires a position based on the reflected waves, as a reflection position P (first position) which is the position of the other vehicle 50 relative to the own vehicle 30. In addition, the vehicle control apparatus of the present embodiment includes an image acquisition device 12 serving as a second position detecting means. The image acquisition device 12 captures an image of the other vehicle 50 by using the image capturing unit 12a (image capturing means) and acquires a position based on the captured image, as an image position Q (second position) which is the position of the other vehicle 50 relative to the own vehicle 30. In addition, the vehicle control apparatus of the present embodiment includes an inter-vehicle distance control ECU 13 serving as a setting means, a parameter acquisition means, and a determining means. The inter-vehicle distance control ECU 13, when serving as the setting means, sets an own lane probability S corresponding to a parameter indicating the position of the other vehicle 50 relative to the own vehicle 30 in a lateral direction perpendicular to the path of the own vehicle 30. The inter-vehicle distance control ECU 13, when serving as the parameter acquisition means, acquires an own lane probability S, based on the reflection position P and the image position Q if the deviation between the reflection position P and the image position Q is smaller than a predetermined value. The inter-vehicle distance control ECU 13 acquires an own lane probability S, based on the reflection position P if the deviation between the reflection position P and the image position Q is equal to or greater than a predetermined value. The inter-vehicle distance control ECU 13, when serving as the determining means, determines whether the other vehicle 50 is in the path of the own vehicle 30 using the acquired own lane probability S.

In addition, the inter-vehicle distance control ECU 13 in the vehicle control apparatus of the present embodiment acquires an own lane probability S in every predetermined control circle. The inter-vehicle distance control ECU 13 acquires an own lane probability S as follows. When a state where the deviation between the reflection position P and the image position Q is equal to or greater than a predetermined value has transitioned to a state where the deviation is smaller than the predetermined value, an own lane probability S is acquired based on the first and second positions described above. When a state where the deviation between the reflection position P and the image position is smaller than a predetermined value has transitioned to a state where the deviation is equal to or greater than the predetermined value, the value of the own lane probability S acquired in the previous control cycle is approximated, by a predetermined value, to the value of the millimeter wave probability based on the reflection position P to acquire the approximated value as an own lane probability S.

With the configuration described above, the vehicle control apparatus of the present embodiment provides the following advantageous effects.

The radar device 11 can accurately calculate a position. In addition, the image acquisition device 12 can accurately determine the presence of a vehicle. In a state of fusion where the reflection position P and the image position Q acquired respectively by the radar device 11 and the image acquisition device 12 having such characteristics are close to each other, there is a high probability that the reflection position P and the image position Q indicate detection of the same vehicle. Thus, in the vehicle control apparatus of the present embodiment, the fusion position F is calculated based on the reflection position P and the image position Q. Using the calculated fusion position F as a basis along with the set probability map, an accurate determination can be made as to whether the other vehicle 50 is in the path of the own vehicle 30. On the other hand, in a state of non-fusion (in a non-fusion state) where the reflection position P and the image position are deviated from each other, the reflection position P may be the position where the other vehicle 50 is present. Thus, the vehicle control apparatus of the present embodiment enables determination as to whether the other vehicle 50 is in the path of the own vehicle 30, based on the reflection position P and the probability map.

In a state of fusion, the reflection position P and the image position Q are close to each other and the position of the other vehicle 50 can be detected accurately. Thus, when the state has transitioned from non-fusion to fusion, the vehicle control apparatus of the present embodiment immediately uses the fusion probability as the own lane probability S to thereby improve the accuracy in determining whether the other vehicle 50 is in the path of the own vehicle 30. On the other hand, when the state has transitioned from fusion to non-fusion, the reflection position P is shifted. Therefore, the state may again transition to fusion. Thus, when the state has transitioned from fusion to non-fusion, immediate use of the millimeter wave probability as the own lane probability S leads to frequent occurrence of selection/deselection of the other vehicle 50 as a preceding vehicle. In this regard, when the state has transitioned from fusion to non-fusion, the vehicle control apparatus of the present embodiment gradually changes the value of the own lane probability S so as to be approximate to the value of the millimeter wave probability to thereby prevent the frequent occurrence of selection/deselection of the other vehicle 50 as a preceding vehicle.

<Modifications>

In the first embodiment described above, the zone widths of the own lane probabilities S on the probability map are corrected when the lane width L1 is equal to or smaller than the reference width L (the processing steps of S104 to S106). However, this should not be construed as a limiting sense. For example, the zone widths of the own lane probabilities S on the probability map may be corrected based on the correction coefficient K even when the lane width L1 is larger than the reference width L. The correction coefficient K in this case is calculated by dividing the lane width L1 by the reference width L. This means that, the processing step of S104 shown in the flow diagram of FIG. 5 may be omitted.

In the first embodiment described above, all of the zone widths of the own lane probabilities S on the probability map are corrected. However, this should not be construed as a limiting sense. For example, correction may be made for only a part of the zone widths of the own lane probabilities S on the probability map. In particular, other vehicle 50 near the path of the own vehicle 30 is required to be selected as a preceding vehicle. Therefore, a zone near the path of the own vehicle 30, e.g., a zone falling in the width of the own vehicle 30 does not have to be necessarily corrected when the zone widths of the own lane probabilities S on the probability map are corrected.

The method of obtaining the correction coefficient K in the first embodiment is not limited to the division of the lane width L1 by the reference width L. For example, a data table or the like may be prepared in advance in which lane widths L1 are correlated with correction coefficients K, and a correlated correction coefficient K may be acquired according to the calculated lane width L1.

In the first embodiment described above, the lane width L1 is calculated by recognizing white lines. However, this should not be construed as a limiting sense. The lane width L1 may be calculated as a result of recognizing the shape of the road, based on a lane separator line other than a white line. Also, the lane width L1 may be calculated as a result of recognizing the shape of the road, based on a structure (still object), such as a guard rail or a median strip, to provided along the lane on the road.

The flow diagrams shown in connection with the first and second embodiments are merely examples of the processing steps performed by the inter-vehicle distance control ECU 13. Thus, the order in which the processing steps are performed may be changed, or the contents of part of the processing steps may be changed.

REFERENCE SIGNS LIST

11 . . . Radar device, 12 . . . Image acquisition device, 13 . . . Inter-vehicle distance control ECU, 30 . . . Own vehicle, 50 . . . Other vehicle, S . . . Own lane probability.

The invention claimed is:

1. A vehicle control device mounted to an own vehicle to control the own vehicle according to a position of an other vehicle ahead of the own vehicle, the vehicle control device comprising:
at least one electronic control unit including a processor and memory, the electronic control unit configured to:
acquire a first position based on a reflected wave, that is reflected from the other vehicle and received by a radar sensor, the first position comprising a position of the other vehicle relative to the own vehicle;
acquire a second position based on an image of the other vehicle that is captured by an imaging sensor, the second position comprising a position of the other vehicle relative to the own vehicle;
set, in the memory, a determination region correlated with a first parameter, the first parameter indicating a position of the other vehicle relative to the own vehicle in a lateral direction perpendicular to a path of the own vehicle, the determination region indicating whether the other vehicle is in the path of the own vehicle;
acquire, from the memory, the first parameter according to a fusion position in response to a deviation between the first position and the second position being smaller than a predetermined value, wherein the fusion position is a position calculated based on the first position and the second position;
acquire, from the memory, the first parameter according to the first position in response to the deviation being equal to or greater than the predetermined value;
calculate a second parameter based on the fusion position and the determination region in response to the deviation being smaller than the predetermined value; and
calculate a third parameter based on the first position and the determination region in response to the deviation being equal to or greater than the predetermined value,
wherein in response to the deviation transitioning from a state of being smaller than the predetermined value in a previous control cycle to a state of being equal to or greater than the predetermined value, the electronic control unit acquires the first parameter according to the first position such that the second parameter acquired in the previous control cycle based on the fusion position gradually changes to the third parameter based on the first position in a subsequent control cycle, and
wherein the electronic control unit controls at least one of an engine control unit and a brake control unit by outputting a control signal to keep a distance between the own vehicle and the other vehicle according to a determination of whether the other vehicle is in the path of the own vehicle that is based on the determination region and the first parameter.

2. The vehicle control device according to claim 1, wherein
the electronic control unit acquires the first parameter in every predetermined control cycle.

3. The vehicle control device according to claim 1, wherein
the electronic control unit acquires the first parameter in every predetermined control cycle, and
in response to the deviation transitioning from a state of being equal to or greater than the predetermined value in a previous control cycle to a state of being smaller than the predetermined value, the electronic control unit acquires the first parameter based on the fusion position in a subsequent control cycle, irrespective of the second parameter of the previous control cycle.

4. The vehicle control device according to claim 1, wherein the electronic control unit
acquires the first parameter in every predetermined control cycle, and in response to the deviation transitioning from a state of being smaller than the predetermined value to a state of being equal to or greater than the predetermined value, the second parameter acquired in the previous control cycle based on the fusion position is approximated to the third parameter, based on the first position to acquire the approximated value as the first parameter.

5. A vehicle control device mounted to an own vehicle to control the own vehicle according to a position of an other vehicle ahead of the own vehicle, the vehicle control device comprising:

a memory;

a processor communicable to the memory; and a set of non-transitory computer-executable instructions stored on the memory that cause the processor to implement:

acquiring a first position based on a reflected wave, that is reflected from the other vehicle and received by a radar sensor, the first position comprising a position of the other vehicle relative to the own vehicle;

acquiring a second position based on an image of the other vehicle that is captured by an image sensor, the second position comprising a position of the other vehicle relative to the own vehicle;

setting, in the memory, a determination region correlated with a first parameter, the first parameter indicating a position of the other vehicle relative to the own vehicle in a lateral direction perpendicular to a path of the own vehicle, the determination region indicating whether the other vehicle is in the path of the own vehicle;

acquiring, from the memory, the first parameter according to a fusion position calculated based on the first position and the second position in response to a deviation between the first position and the second position being smaller than a predetermined value, wherein the fusion position is a position calculated based on the first position and the second position; and acquiring, from the memory, the first parameter according to the first position in response to the deviation being equal to or greater than the predetermined value, wherein in response to the deviation being equal to or greater than the predetermined value, the processor calculates a second parameter based on the fusion position and the determination region, and in response to the deviation being smaller than the predetermined value, the processor calculates a third parameter based on the first position and the determination region, in response to the deviation transitioning from a state of being smaller than the predetermined value in a previous control cycle to a state of being equal to or greater than the predetermined value, the processor acquires the first parameter according to the first position such that the second parameter acquired in the previous control cycle based on the fusion position gradually changes to the third parameter based on the first position in a subsequent control cycle, and the processor controls at least one of an engine control unit and a brake control unit by outputting a control signal to keep a distance between the own vehicle and the other vehicle according to a determination of whether the other vehicle is in the path of the own vehicle that is based on the determination region and the first parameter.

* * * * *